(12) United States Patent
Lin

(10) Patent No.: US 6,442,014 B1
(45) Date of Patent: Aug. 27, 2002

(54) CHIP TYPE CAPACITOR

(76) Inventor: Chieh-Fu Lin, No. 7, Ta Yeou 2 St., Ta Fa Ind. Dist., Ta Liau Hsiang, Kaohsiung Hsien (TW)

( * ) Notice: Subject to any disclaimer, the term of this patent is extended or adjusted under 35 U.S.C. 154(b) by 0 days.

(21) Appl. No.: 10/027,540

(22) Filed: Dec. 20, 2001

(30) Foreign Application Priority Data

Aug. 3, 2001 (TW) .......................................... 90213145

(51) Int. Cl.$^7$ .............................. H01G 4/00; H01G 2/10
(52) U.S. Cl. ...................... 361/301.3; 361/517; 361/535
(58) Field of Search .............................. 361/301.3, 517, 361/518, 519, 535, 536, 537; 174/52.3, 52.4

(56) References Cited

U.S. PATENT DOCUMENTS

| | | | | |
|---|---|---|---|---|
| 4,314,313 A | * | 2/1982 | Elias et al. | 29/25.03 |
| 5,847,919 A | * | 12/1998 | Shimizu et al. | 361/303 |
| 6,118,646 A | * | 9/2000 | Yang et al. | 174/52.1 |
| 6,292,348 B1 | * | 9/2001 | Lin | 361/272 |

* cited by examiner

*Primary Examiner*—Anthony Dinkins
(74) *Attorney, Agent, or Firm*—Pro-Techtor International Services

(57) ABSTRACT

A chip type capacitor having a casing cover, a dielectric, an elastomer, and a cover plate. The casing cover is formed as the outer casing of a capacitor. An open receiving chamber is provided in the casing cover. A plurality of lines capable of being broken are formed at a bottom of the casing cover. The dielectric is received in the receiving chamber of the casing cover. The dielectric has two lead pins. The elastomer has two first through holes. The lead pins pass through the first through holes of the elastomer so that the elastomer covers the dielectric. The cover plate has two second through holes. The lead pins of the dielectric pass through the second through hole of the cover plate so that the cover plate covers the elastomer. An outer diameter of the elastomer is slightly larger than the inner diameter of an inner wall of the receiving chamber. The elastomer is compressed by a fixture and then the elastomer is placed in the receiving chamber for enhancing the sealing of the capacitor.

10 Claims, 9 Drawing Sheets

CHIP TYPE CAPACITOR

BACKGROUND OF THE INVENTION

1. Filed of the Invention

The present invention relates to a chip type capacitor, and especially to chip type capacitor having an elastomer of which the outer diameter slightly larger than the inner wall of a receiving chamber is used to increase the sealing tightness of the capacitor.

2. Description of the Related Art

Referring to FIG. 1, an exploded perspective view of a prior chip type capacitor is illustrated. The chip type capacitor is formed by a casing cover 110, an dielectric 120, an inner cover plate 130, and an outer cover plate 140. The dielectric 120 is placed in the receiving chamber 111 of the casing cover 110. After adding electrolyte, the inner cover plate 130 cover the casing cover 110. Two lead pins 121 of the dielectric 120 pass through two through holes 131 of the inner cover plate 130. After filling glue on the inner cover plate 130, the outer cover plate 140 covers the casing cover 110 and the two are combined by sticky. The two lead pins 121 pass through the two through holes 141 of the outer cover plate 140.

In this prior chip type capacitor, when the dielectric 120 is placed in the receiving chamber 111 of the casing cover 110 and after the electrolyte is filled thereinto, the inner wall of the receiving chamber 111 of the casing cover 110 will adhere the electrolyte. Therefore, the inner cover plate 130 and the outer cover plate 140 are not be firmly secured to the casing cover 110. Thereby, the dielectric 120 may separate from the casing cover 110. The capacitor can not be functioned correctly.

SUMMARY OF THE INVENTION

Accordingly, the primary object of the present invention is to provide a chip type capacitor, wherein an elastomer having an outer diameter slightly larger than the inner wall of a receiving chamber is used to increase the tightness of the elastomer.

Another object of the present invention is to provide a chip type capacitor, wherein the chip type capacitor has a simple structure so that it can be mass-produced easily.

To achieve the object, the present invention provides a chip type capacitor, comprising a casing cover, a dielectric, an elastomer, and a cover plate. The casing cover is formed as an outer casing of a capacitor and an open receiving chamber is provided therein. A plurality of lines capable of being broken are formed at a bottom of the casing cover. The dielectric is received in the receiving chamber of the casing cover. The dielectric has two lead pins. The elastomer has two first through holes. The lead pins pass through the first through holes of the elastomer so that the elastomer covers the dielectric. The cover plate has two second through holes. The lead pins of the dielectric pass through the second through hole of the cover plate so that the cover plate covers the elastomer. An outer diameter of the elastomer is slightly larger than the inner diameter of an inner wall of the receiving chamber. The elastomer is compressed by a fixture and then the elastomer is placed in the receiving chamber for enhancing the sealing of the capacitor.

The four corners of an upper edge of an open end of the casing cover are formed with four pins. The cover plate has four through holes at positions with respect to the four pins. The length of the pin is longer than the thickness of the cover plate. After the cover plate is installed on the elastomer, protruded parts of the pins are melted. Therefore, the cover plate is tightly fixed to the casing cover.

In another embodiment of the present invention, an open end of the casing cover is formed with a wall frame so that the cover plate is combined to the wall frame. Furthermore, the four pins in above embodiment are not utilized. Only four smaller projections are formed. Furthermore, the cover plate and the casing cover are stuck by supersonic combination way.

The various objects and advantages of the present invention will be more readily understood from the following detailed description when read in conjunction with the appended drawing.

DETAILED DESCRIPTION OF THE INVENTION

Figure 1:
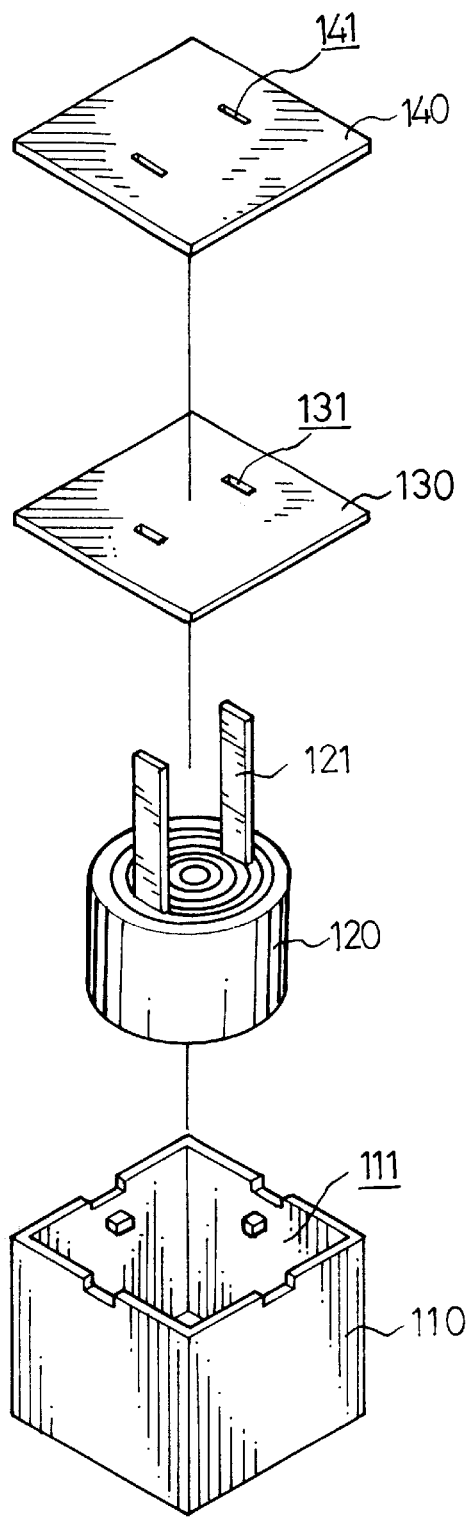
FIG. 1 is an exploded perspective view of a prior art chip type capacitor.
Figure 2:
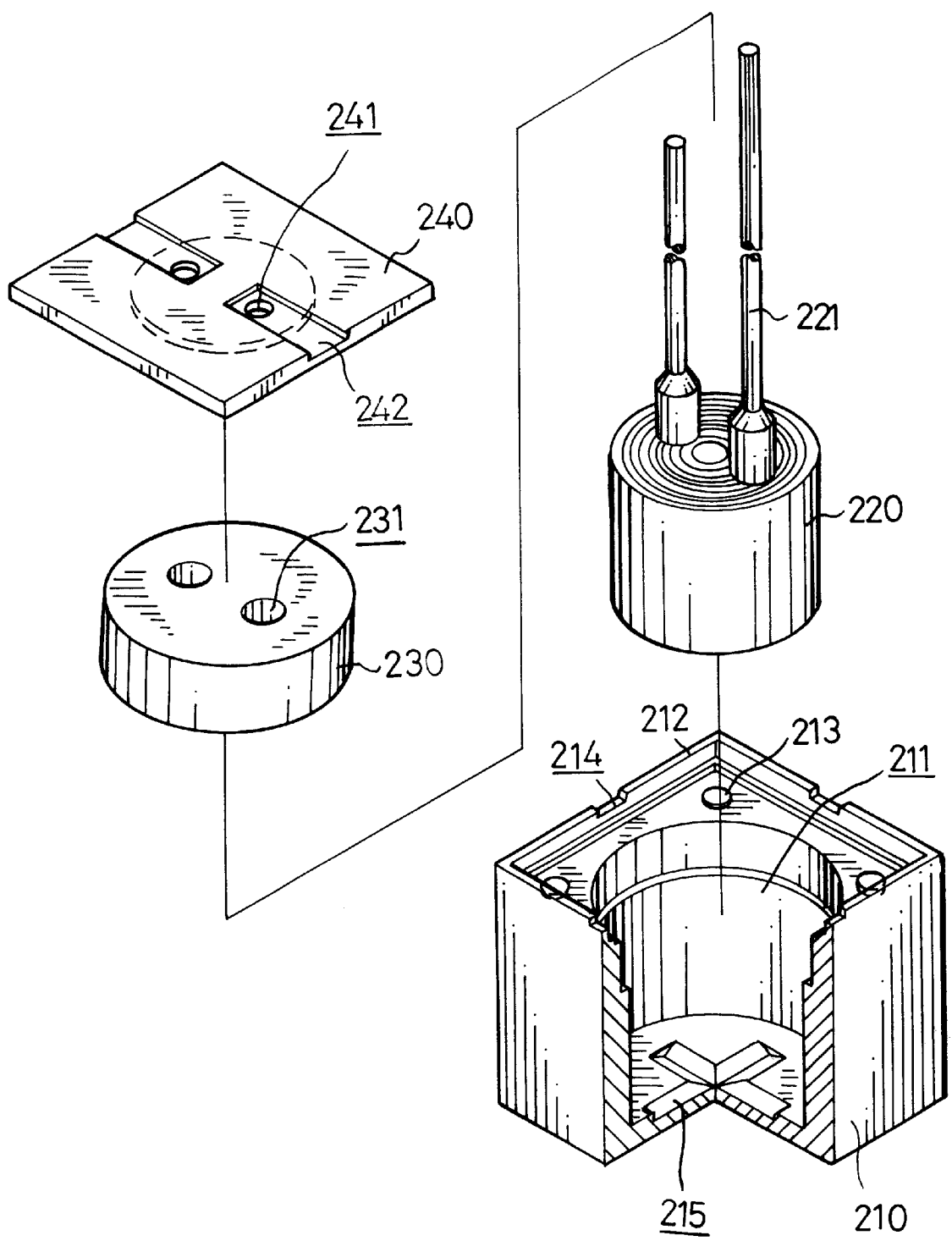
FIG. 2 is an exploded perspective view of the first embodiment of the present invention

Referring to FIG. 2, the first embodiment of the present invention will be described. The casing cover 210 forms as a casing of a capacitor, which is made of insulating material. It is preferable that the shape of the casing cover 210 is rectangular. An open receiving chamber 211 is provided in the casing cover 210. It is preferable that the receiving chamber 211 has a round shape. The receiving chamber 211 may be received with a dielectric 220 and an elastomer 230. Thereby, the elastomer 230 may be tightly engaged in the receiving chamber 211. An open end of the casing cover 210 has a wall frame 212. A cover plate 240 may be placed in the wall frame 212. If necessary, a periphery of the open end of the receiving chamber 211 has protrusions 213. The wall frame 212 may be formed with notches 214. A bottom of the casing cover 210 has a plurality of lines 215 capable of being broken. Since as a capacitor is used, it is possible that the input current is over a rated load, or due to a fatigue that the capacitor is used for a longer time, the capacitor is overloaded and generated gas. Since the lines 215 to be broken are weakest places, a pressure from the gas will cause the lines 215 to be split and thus gas flows out. Thus gas will be released from the cracks of the lines 215. Therefore, the dielectric 220 from the explosion will not scatter out to damage other circuit element.

The dielectric 220 has a conventional structure. The dielectric 220 has two lead pins 221. The dielectric 220 is received in the receiving chamber 211 of the casing cover 210. The lead pins 221 may protrude out of the casing cover 210. The cross sections of the two lead pins 221 may has round shapes or rectangular shapes.

Figure 3:
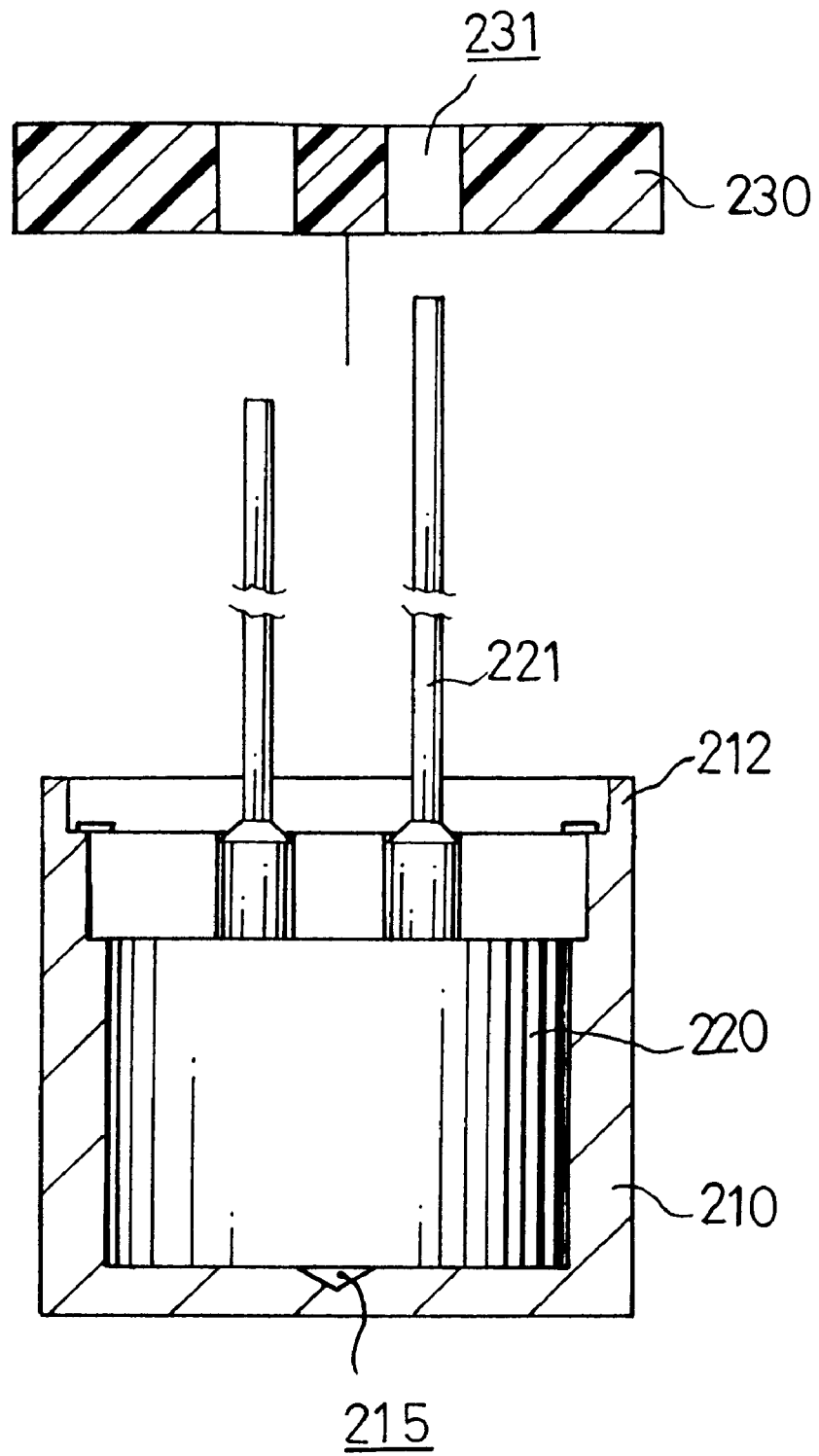
FIG. 3 is a schematic view showing the size of the elastomer and the casing cover in the first embodiment of the present invention.

The elastomer 230 is a deformable body made of rubber or silicon. An outer diameter of the elastomer 230 is slightly larger than the inner diameter of the receiving chamber 211. Referring to FIG. 3, the elastomer 230 is compressible to have a smaller outer diameter. When the elastomer 230 is compressed and become smaller, it can be easily placed in the receiving chamber 211 of the casing cover 210. As the pressure for compressing the elastomer 230 disappears, the elastomer 230 may expand to return to the original shape so as to be tightly adhered to a predetermined position of the receiving chamber 211. The elastomer 230 has two through holes 231 for being passed through by the two lead pins 221 of the dielectric 220.

The cover plate 240 serves to seal the open end of the casing cover 210. The cover plate 240 may be combined to the wall frame 212 of the casing cover 210. Any fixing combining way can be used to combine the casing cover 210 and the wall frame 212 to the casing cover 210. In this embodiment, the cover plate 240 is fixed to the casing cover 210 by supersonic combining way. The protrusion 213 of the casing cover 210 can be used to increase the sticky surface between the cover plate 240 and the casing cover 210 so that the combination of the cover plate 240 and the casing cover 210 are more firmly. The cover plate 240 has two through holes 241 for being passed through by two lead pins 221 of the dielectric 220. If necessary, the grooves 242 of the two through holes 241 may extend to the edges of the cover plate 240. Thereby, the grooves 242 are matched to the notches 214 of the casing cover 210.

Figure 4:
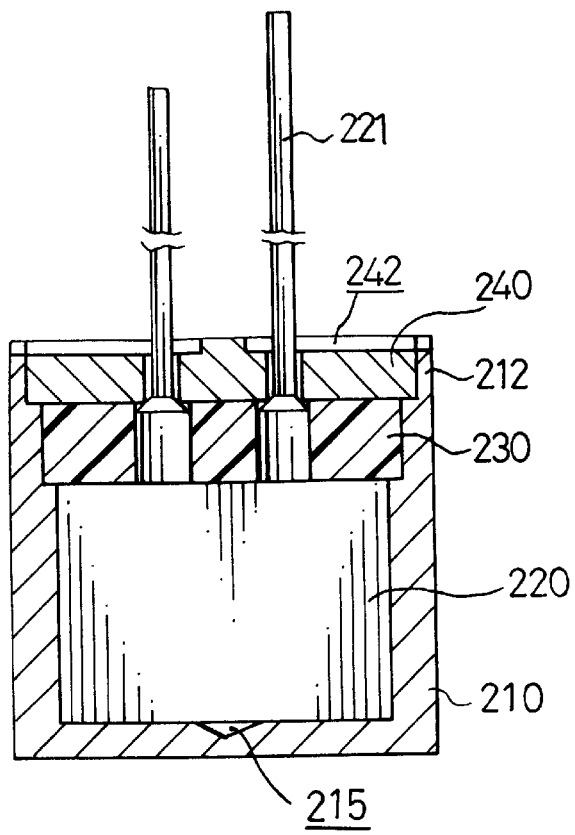
FIG. 4 is an assembled cross section view of the first embodiment of the present invention.

Referring to FIG. 4, an assembled cross section view of the first embodiment of the present invention is illustrated. The dielectric 220 is placed in the receiving chamber 211 of the casing cover 210. Then, the through hole 231 of the elastomer 230 is aligned to the lead pins 221 of the dielectric 220 for being passed through by the lead pins 221 of the dielectric 220. Since the outer diameter of the elastomer 230 is larger than the inner diameter of the receiving chamber 211 of the casing cover 210, the elastomer 230 can be compressed by fixtures or other ways so that the outer diameter is reduced. Meanwhile, the elastomer 230 with a small outer diameter is placed in the receiving chamber 211 of the casing cover 210. When the force to compress the elastomer 230 disappears, the elastomer 230 may expand to restore to the original shape so as to tightly fix to the inner wall of the receiving chamber 211. As a result, the objects of combination, positioning, and assembly are achieved. Then, the cover plate 240 is fixed to the wall frame 212 of the casing cover 210. Supersonic combination is preferable. Then, the lead pins 221 of the dielectric 220 protrudes out of the cover plate 240. When the protruded pins 221 are not bent, the capacitor can be used in general inserting plate.

Figure 5:
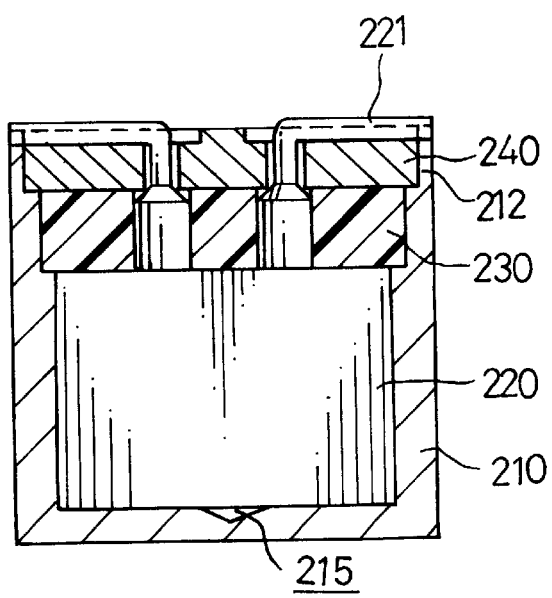
FIG. 5 is an assembled cross section view of the first embodiment in the present invention.

With reference to FIG. 5, when the lead pins 221 protruded from the through hole 241 of the cover plate 240 are bent, most of the lead pins 221 are disposed in the grooves 242. Therefore, only a small part of the lead pin protrudes from the surface of the cover plate 240. Therefore, the capacitor can be suitable to the surface mounting technology (SMT) in automatic process.

Figure 6:
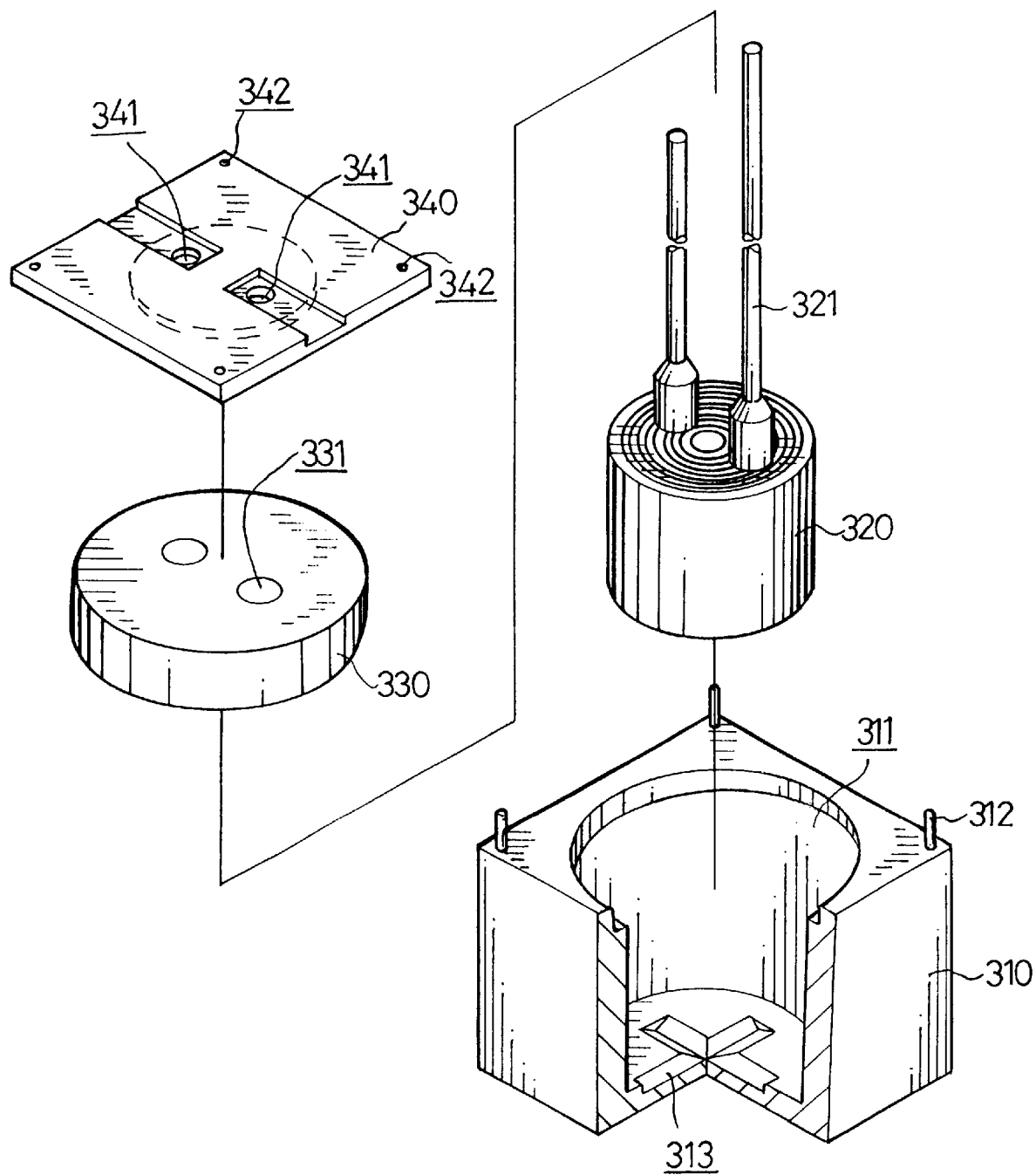
FIG. 6 is an exploded perspective view of the second embodiment in the present invention.

Referring to FIG. 6, an exploded perspective view of the second embodiment of the present invention is illustrated. The casing cover 310 forms a casing of a capacitor, which is made of insulating material. It is preferable that the shape of the casing cover 310 is rectangular. An open receiving chamber 311 is formed in the casing cover 310. It is preferable that the receiving chamber 311 has a round shape. The receiving chamber 311 may be received with a dielectric 320 and an elastomer 330. The four corners of the upper edge of the open end of the casing cover 310 are formed with four pins 312. A bottom of the casing cover 310 has a plurality of lines 313 for being broken. Since as a capacitor is used, it is possible that the input current is over a rated load, or due to a fatigue that the capacitor is used for a longer time, the capacitor is overloaded and generated gas. Since the lines 313 to be broken are weakest places, a pressure from the gas will cause the lines 313 to be split and thus gas flows out. Thus gas will be released from the cracks of the lines 313, Therefore, the dielectric 320 from the explosion will not scatter out to damage other circuit element.

The dielectric 320 has a conventional structure. The dielectric 320 has two lead pins 321. The dielectric 320 is placed in the receiving chamber 311 of the casing cover 310. The lead pins 321 may protrude out of the casing cover 310. The cross sections of the two lead pins 321 may has round shapes or rectangular shapes.

Figure 7:
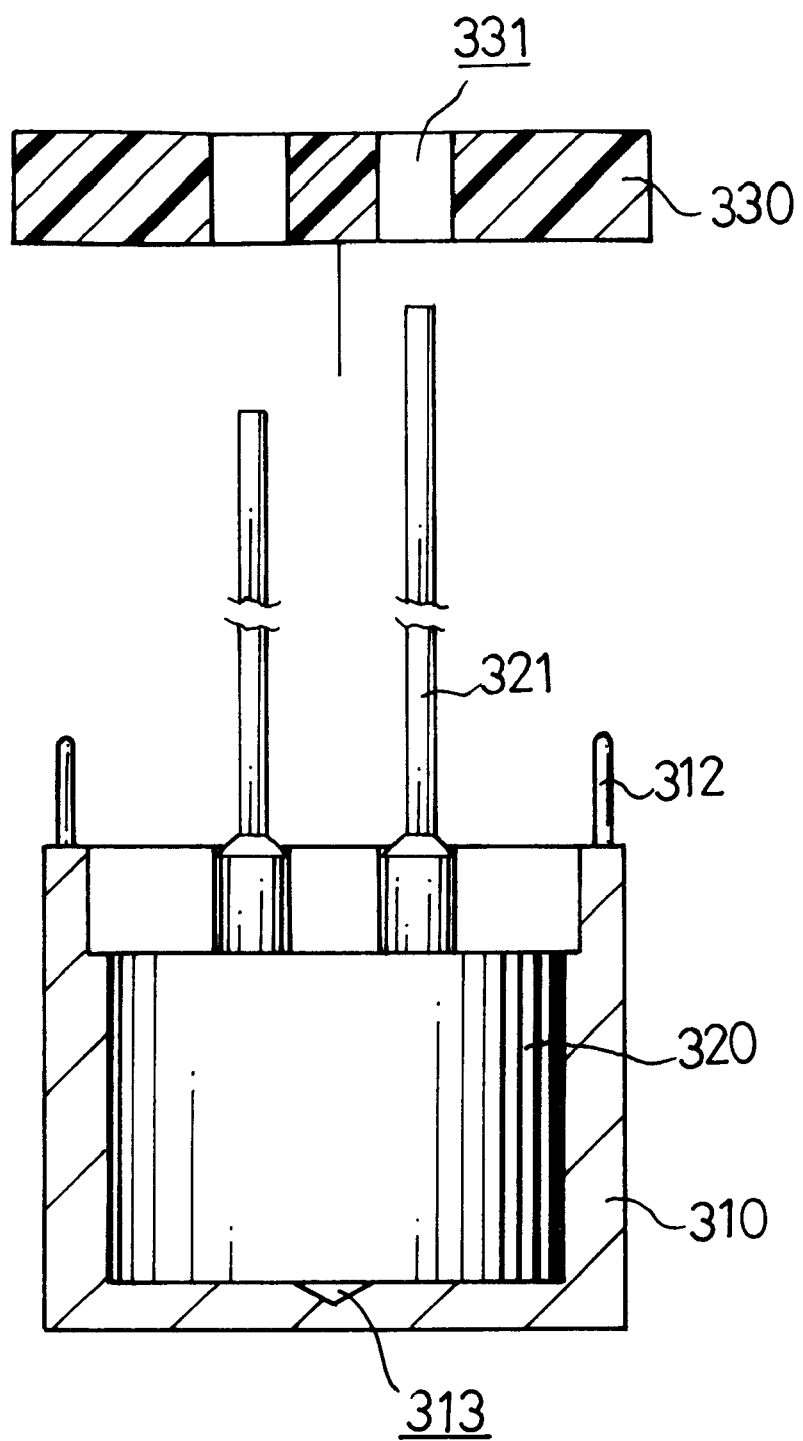
FIG. 7 is a schematic view showing the elastomer and the casing cover of the second embodiment in the present invention.

The elastomer 330 is a deformable body made of rubber or silicon. An outer diameter of the elastomer 330 is slightly larger than the inner diameter of the receiving chamber 311. Referring to FIG. 7, the elastomer 330 is compressible to have a smaller outer diameter. When the elastomer 330 is compressed and become smaller, it can be easily placed in the receiving chamber 311 of the casing cover 310. As the pressure for compressing the elastomer 330 is disappeared, the elastomer 330 may expand to return to the original shape so as to tightly adhere to a predetermined position of the receiving chamber 311. The elastomer 330 has two through holes 331 for being passed by the two lead pins 321 of the dielectric 320.

The cover plate 340 serves to seal the open end of the casing cover 310.The cover plate 340 has two through holes 341 and four through holes 342 with respect to the two lead pins 321 and four pins 312. The two lead pins 321 of the dielectric 320 may pass through the two through holes 341. The four through hole 342 may be passed through by the four pins 312.

Figure 8:
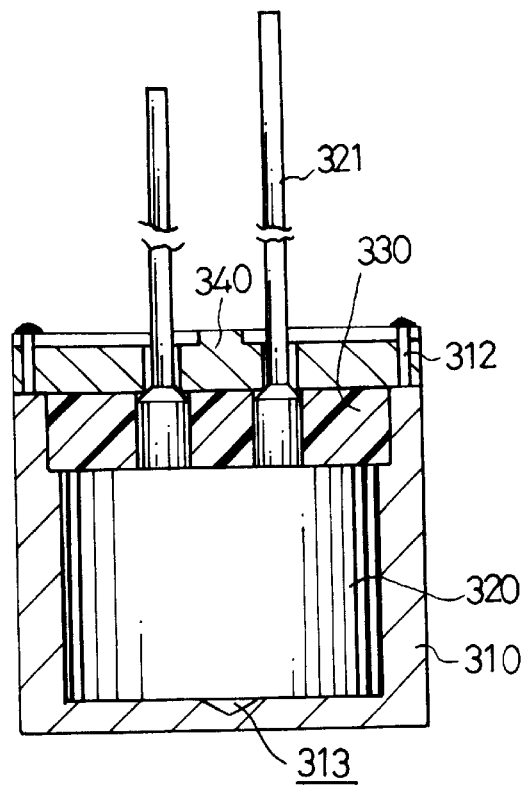
FIG. 8 is an assembled cross section view of the second embodiment of the present invention.

Referring to FIG. 8, an assembled cross section view of the second embodiment of the present invention is illustrated. The dielectric 320 is placed in the receiving chamber 311 of the casing cover 310. Then, the through hole 331 of the elastomer 330 is aligned to the lead pins 321 of the dielectric 320 for being passed through by the lead pins 321 of the dielectric 320. Since the outer diameter of the elastomer 330 is larger than the inner diameter of the receiving chamber 311 of the casing cover 310,the elastomer 330 can be compressed by fixtures or other ways so that the outer diameter is reduced. Meanwhile, the elastomer 330 with a small outer diameter is placed in the receiving chamber 311 of the casing cover 310. When the force to compress the elastomer 330 disappears, the elastomer 330 may expand to restore to the original shape so as to tightly fix to the inner wall of the receiving chamber 311. As a result the objects of combination, positioning, and assembly are achieved. Then, the cover plate 340 is placed to cover the elastomer 330.

Since the length of the lead pins 312 is longer than the thickness of the cover plate 340. The protruded part of the pines 312 are melted by heating so that the cover plate 341 is firmly secured to the casing cover 310.

Figure 9:
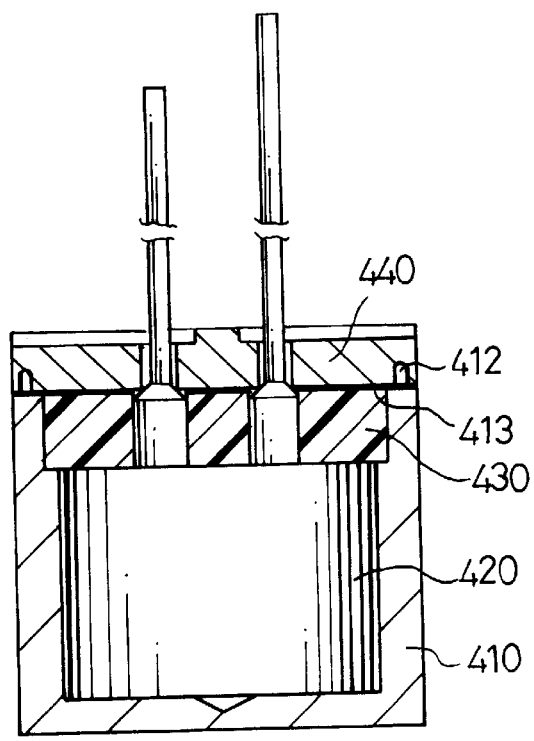
FIG. 9 is an assembled cross section view of the third embodiment of the present invention.

Referring to FIG. 9, the assembled cross section view of the third embodiment of the present invention is illustrated. In this embodiment, the casing cover 410, dielectric 420, and elastomer 430 are identical to those in second embodiment. The difference is that the length of the pin 412 is smaller than the thickness of the cover plate 440. The cover plate 440 has four blind holes at positions with respect to the four pins 412 instead of through holes. A sticky agent 413 is coated between the cover plate 440 and the elastomer 430 so that after covering the cover plate 440, it can be tightly engaged to the upper edge of the open end of the casing cover 410 and the elastomer 430.

Figure 10A:
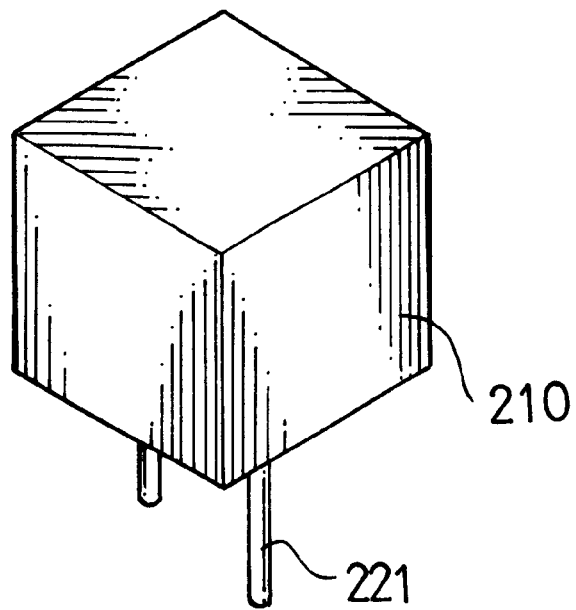
FIG. 10A is a perspective view of the second embodiment of the present invention.
Figure 10B:
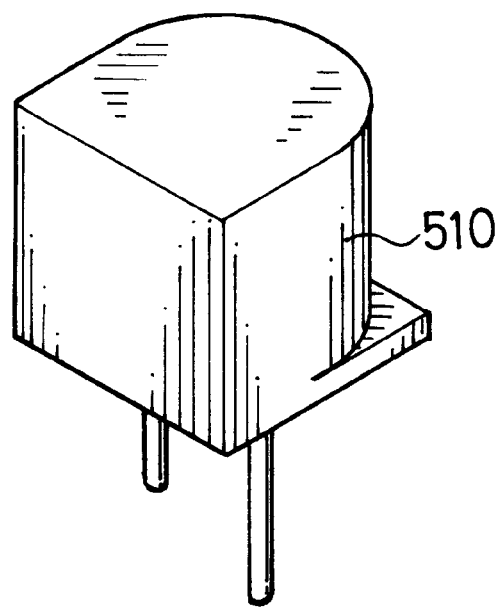
FIG. 10B is a perspective view of the fourth embodiment of the present invention.
Figure 10C:
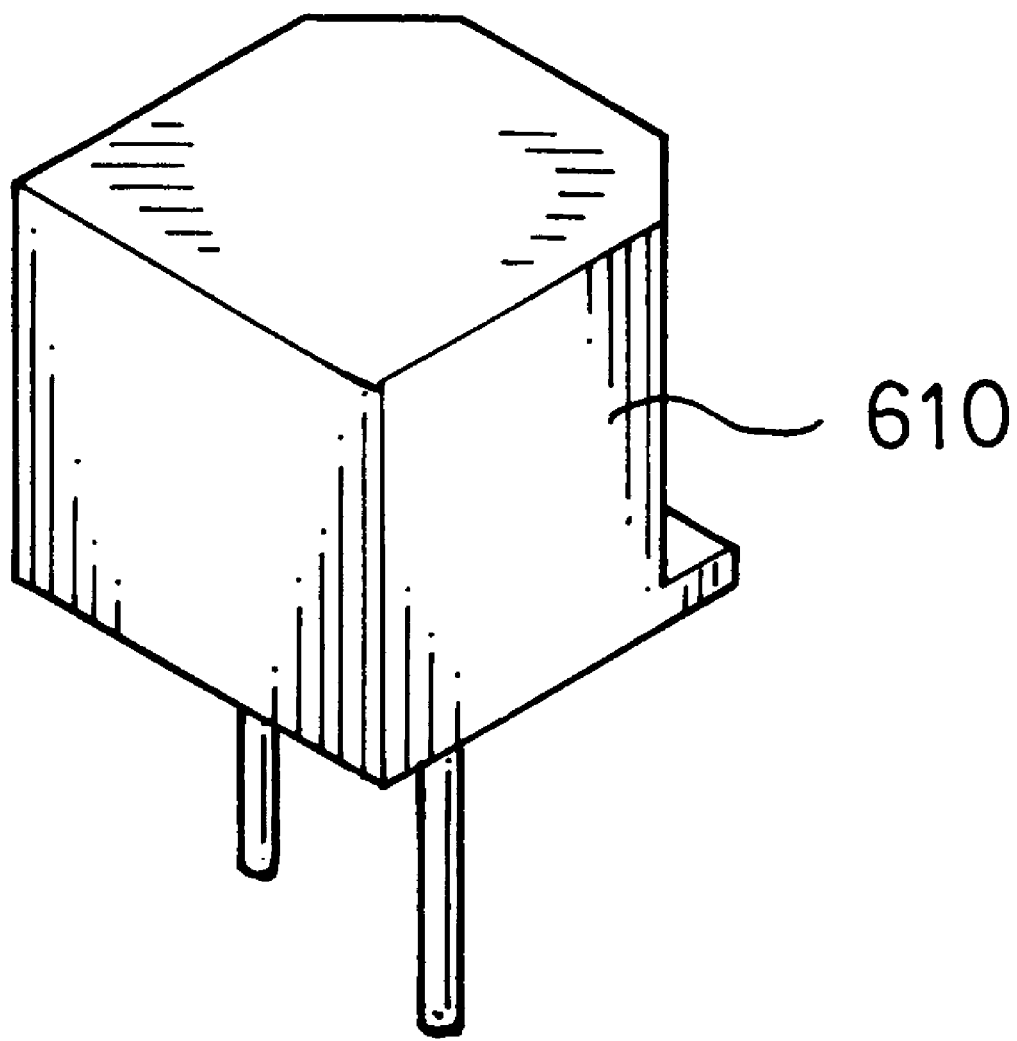
FIG. 10C is a perspective view of the fifth embodiment of the present invention.

Referring to FIG. 10A, a perspective view of the first embodiment of the present invention is illustrated. The casing cover 210 has a rectangular shape, but it can not present the directivity of a capacitor. Referring to FIG. 10B, the perspective view of the fourth embodiment of the present invention is illustrated. One surface of the casing cover 510 is installed with a semicircle projection for indicating the directivity of the capacitor. Further, With reference to FIG. 10C, the fifth embodiment of the present invention is illustrated, two adjacent corners of the casing cover 610 are chamfered for indicating the direction of the capacitor. These ways for presenting the directivity of the capacitor can be used in second and third embodiment.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A chip type capacitor comprising a casing cover, a dielectric, an elastomer, and a cover plate; wherein the casing cover is formed as an outer casing of a capacitor and an open receiving chamber is provided therein; a plurality of lines capable of being broken are formed at a bottom of the casing cover; the dielectric is received in the receiving chamber of said casing cover; the dielectric has two lead pins; the elastomer has two first through holes; said lead pins pass through the first through holes of the elastomer so that the elastomer covers said dielectric; the cover plate has two second through holes, said lead pins of said dielectric pass through the second through hole of the cover plate so that the cover plate covers said elastomer; characterized in that: an outer diameter of said elastomer is slightly larger than the inner diameter of an inner wall of said receiving chamber; said elastomer is compressed by a fixture and then the elastomer is placed in said receiving chamber for enhancing the sealing of the capacitor.

2. The chip type capacitor of claim 1, wherein the four corners of an upper edge of an open end of said casing cover are formed with four pins; said cover plate has four through holes at positions with respect to the four lead pins; length of the pin is longer than a thickness of said cover plate, after said cover plate is installed on said elastomer, protruded parts of the pins are melted, thereby, said cover plate is tightly fixed to said casing cover.

3. The chip type capacitor of claim 1, wherein the four corners at an upper edge of an open end of said casing cover are formed with four pins; said cover plate has four blind holes at positions with respect to the four pins; length of the pin is shorter than a thickness of said cover plate, a sticky agent is coated between said cover plate and said elastomer so that after covering the cover plate it can be tightly engaged to the upper edge of the open end of said casing cover and said elastomer.

4. The chip type capacitor of claim 2, wherein the casing cover has a cubic shape, and one surface of the casing cover is installed with a semicircle projection for indicating the directivity.

5. The chip type capacitor of claim 2, wherein the casing cover has a cubic shape and two adjacent corners of the casing cover are chamfered to present the directivity of the capacitor.

6. A chip type capacitor comprising a casing cover, a dielectric, an elastomer, and a cover plate; wherein the casing cover is formed as an outer casing of a capacitor and an open receiving chamber is provided therein; an open end of the casing cover has a wall frame; a plurality of lines capable of being broken are formed at a bottom of the casing cover; the dielectric is received in the receiving chamber of said casing cover; the dielectric has two lead pins; the elastomer has two first through holes; said lead pins pass through the first through holes of the elastomer so that the elastomer covers said dielectric; the cover plate has two second through holes, said lead pins of said dielectric pass through the second through hole of the cover plate so that the cover plate covers said elastomer and is combined with the wall frame; characterized in that: an outer diameter of said elastomer is slightly larger than the inner diameter of an inner wall of said receiving chamber; said elastomer is compressed by a fixture and then said elastomer is placed in said receiving chamber for enhancing the sealing of the capacitor.

7. The chip type capacitor of claim 6, wherein the wall frame has notches, and the cover plate has grooves which extend to an edge of the cover plate and is matched to the notches of the wall frame.

8. The chip type capacitor of claim 6, wherein the cover plate and the casing cover are combined by supersonic combination way.

9. The chip type capacitor of claim 8, wherein the casing cover has a cubic shape and one surface of the casing cover has a semicircle projection for presenting the directivity of the capacitor.

10. The chip type capacitor of claim 8, wherein the cover plate has a cubic shape and two adjacent corners of the casing cover are chamfered for presenting the directivity of the capacitor.

* * * * *